(12) United States Patent
Grangeon et al.

(10) Patent No.: US 8,069,990 B2
(45) Date of Patent: Dec. 6, 2011

(54) SEALING GASKET FOR A FILTER ELEMENT, AND A MODULE INCLUDING A FILTER ELEMENT FITTED WITH SUCH A SEALING GASKET

(75) Inventors: André Grangeon, Valreas (FR);
Philippe Lescoche, Faucon (FR);
Michel Millares, Nyons (FR)

(73) Assignee: Technologies Avancees & Membranes Industrielles, Nyons (FR)

( * ) Notice: Subject to any disclaimer, the term of this patent is extended or adjusted under 35 U.S.C. 154(b) by 1273 days.

(21) Appl. No.: 10/451,532

(22) PCT Filed: Dec. 24, 2001
(Under 37 CFR 1.47)

(86) PCT No.: PCT/FR01/04189
§ 371 (c)(1),
(2), (4) Date: Apr. 29, 2004

(87) PCT Pub. No.: WO02/053270
PCT Pub. Date: Jul. 11, 2002

(65) Prior Publication Data
US 2005/0067795 A1    Mar. 31, 2005

(30) Foreign Application Priority Data
Dec. 29, 2000 (FR) .................................. 00 17329

(51) Int. Cl.
*B01D 29/00* (2006.01)
*B01D 35/00* (2006.01)
*B01D 35/28* (2006.01)
*B01D 63/00* (2006.01)

(52) U.S. Cl. .................. 210/450; 210/323.1; 210/323.2; 210/435; 210/445; 210/455; 210/321.87; 210/321.88; 210/321.89; 210/321.64; 210/321.72; 210/321.78; 210/321.79; 210/321.8

(58) Field of Classification Search .................. 210/450, 210/323.2; 277/918, 628, 626, 602
See application file for complete search history.

(56) References Cited

U.S. PATENT DOCUMENTS 2,030,874 A * 2/1936 Lytle ...................... 52/204.597
4,546,987 A * 10/1985 Bucher et al. ................ 277/615
4,849,104 A * 7/1989 Garcera et al. ............. 210/323.2

FOREIGN PATENT DOCUMENTS

| EP | 821996 | 7/1997 |
| FR | 2786109 | 5/2000 |
| JP | 01051108 | 2/1989 |

* cited by examiner

*Primary Examiner* — Benjamin Kurtz
(74) *Attorney, Agent, or Firm* — Clark & Brody

(57) ABSTRACT

The invention provides a sealing gasket for mounting in a passage (5) of a support plate (4) to surround the end of a tubular-shaped filter element (3) provided with at least one fluid flow channel ($3_1$), the channel lying within a flow section Sc, the gasket being constituted in the form of a sleeve:
  possessing a height h not less than the height hps of the passage (5) in the support plate (4); and
  presenting an overlap bore (15) for the filter element (3) defined between one end (16) of the sleeve and a shoulder (17) which co-operates with the other end of the sleeve to define a channel bore (19) for the fluid, the shoulder (17) possessing a surface for acting as an abutment for the terminal portion of the filter element and presenting dimensions that are adapted to extend outside the flow section Sc so as to avoid impeding fluid circulation, the overlap bore (15) being provided with a groove (28) adjacent to the shoulder (17) in order to allow the gasket to creep.

12 Claims, 2 Drawing Sheets

SEALING GASKET FOR A FILTER ELEMENT, AND A MODULE INCLUDING A FILTER ELEMENT FITTED WITH SUCH A SEALING GASKET

The present invention relates to the technical field of molecular or particulate separation using filter or separation elements generally referred to as membranes, adapted to separate molecules or particles contained in a fluid medium for processing.

The present invention relates more particularly to technical means adapted to provide sealing for such filter or separation elements.

The subject matter of the invention finds a particularly advantageous application in the field of filtering, in the broad sense, a fluid medium for processing, and in particular nano-filtering, ultrafiltering, microfiltering, etc.

In the state of the art, it is known to use a filter module constituted by a metal case fitted at each end with a support plate arranged to present one or more packages for allowing filter elements of tubular shape to be positioned relative to one another. The filter elements thus extend inside the case parallel to one another and they are mounted in leaktight manner at each end to a support plate.

Each filter element has at least one flow channel for the fluid to be processed, the channel extending from one terminal portion to the other terminal portion of the element. Filter elements perform cross-flow filtering of the fluid in order to obtain, at the peripheral surface of the filter elements, an outlet filtrate that is designed to be recovered in a collection volume situated between the support plates and the case.

In order to ensure sealing between the terminal portions of the filter elements and the support plates, sealing gaskets are positioned and clamped by means of a metal backplate fixed on each support plate. The sealing gaskets are made of deformable material such as an elastomer or a rubber so that on being tightened they provide sealing between the support plates and the filter elements.

Unfortunately, it sometimes happens that filter elements are broken at their terminal portions positioned in the support plates. The Applicant has found that the main cause of filter elements breaking at the support plates comes from friction between the filter element and the support plate and/or the clamping back plate.

On the basis of that observation, the Applicant has developed a novel sealing gasket for a filter element that is designed to avoid the elements becoming eroded by contact with the support plates and/or the clamping backplates, without disturbing fluid flow.

The object of the invention is thus to propose a sealing gasket for mounting in a passage of a support plate to surround the end of a filter element of tubular shape that is provided with at least one flow channel for a fluid, said channel lying within a flow section.

According to the invention, the sealing gasket is made in the form of a sleeve:
  possessing a height not less than the height of the passage in the support plate; and
  presenting an overlap bore for the filter element defined between one end of the sleeve and a shoulder which co-operates with the other end of the sleeve to define a channel bore for the fluid, the shoulder possessing a surface for acting as an abutment for the terminal portion of the filter element and presenting dimensions that are adapted to extend outside the flow section so as to avoid impeding fluid circulation, the overlap bore being provided with a groove adjacent to the shoulder in order to allow the gasket to creep.

The sealing gasket of the invention makes it possible to avoid any contact between the filter elements and the metal portions constituted by the clamping backplates and by the support plates. By implementing an abutment for the filter elements, the filter elements are prevented from moving under the effect of the pressure difference that arises between their upstream and downstream terminal portions, such that a filter element can no longer move, and consequently can no longer come into contact with the metal backplate.

Various other characteristics appear from the description given below with reference to the accompanying drawings which, as non-limiting examples, show embodiments and implementations of the invention.

Figure 1:
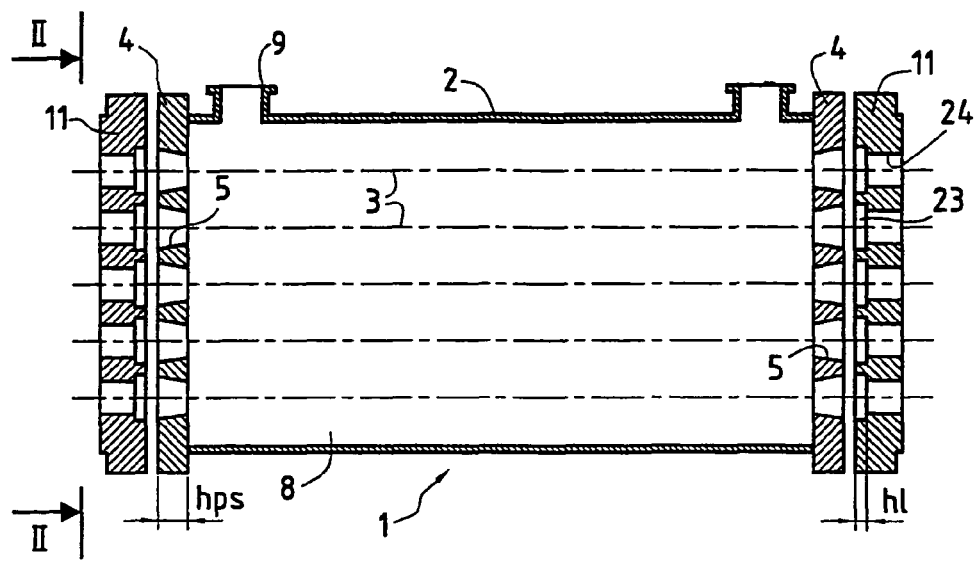
FIG. 1 is an elevation section view of an embodiment of a filter module using a sealing gasket in accordance with the invention.
Figure 2:
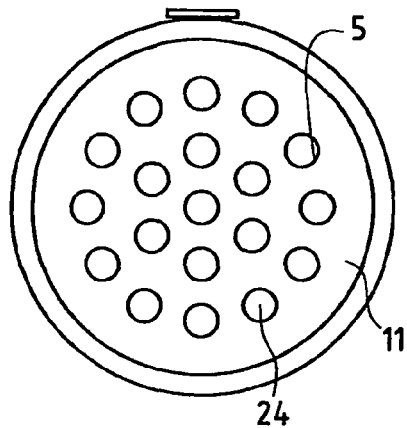
FIG. 2 is a transverse view looking substantially along lines II-II of FIG. 1.

As can be seen more clearly in FIGS. 1 and 2, the subject matter of the invention is implemented for a device or module 1 performing cross-flow filtering for a fluid to be treated that can be of any kind. In a case or cylinder 2, the module 1 comprises one, and more generally a series of tubular-shaped filter elements 3 extending parallel to one another and represented in FIG. 1 solely by their axes. As can be seen more clearly from FIGS. 3 and 4, each filter element 3 possesses a right cross-section of outside shape that is hexagonal, for example, or circular as in the example shown. Each filter element 3 comprises at least one, and in the example shown, three channels $3_1$ extending parallel to the longitudinal axis of the filter element 3 so as to open out in each of its terminal portions 3a and 3b. The surface of each channel $3_1$ is covered in at least one separating layer (not shown) that is designed to come into contact with the fluid medium for processing that flows inside the channel. The nature of the or each separating layer is selected as a function of the separation or filtering power that is to be obtained.

At each of their terminal portions 3a, 3b, the filter elements 3 are mounted on a support plate 4 which is fixed in leaktight manner to each end of the case 2. In conventional manner, each support plate 4 has a number of passages 5 equal to the number of filter elements 3 that are mounted inside the case 2. Each passage 5 is preferably of tapering shape with its smaller end opening to the inside of the enclosure defined by the case 2. Each passage 5 enables a terminal portion of a tubular filter element 3 to be positioned. Each passage 5 is designed to be fitted with a sealing gasket 6 in accordance with the invention so as to ensure that the filter elements 3 are mounted in leaktight manner on the support plates 4. Between themselves and the case 2, the support plates 4 define a collecting enclosure 8 which communicates through at least one outlet 9 for delivering the filtrate, i.e. the fluid medium that has passed through the filter elements 3. In conventional manner, each support plate 4 is designed to have mounted thereon by any appropriate means a clamping backplate 11 that serves to deform the sealing gasket 6 in order to obtain good sealing.

Figure 3:
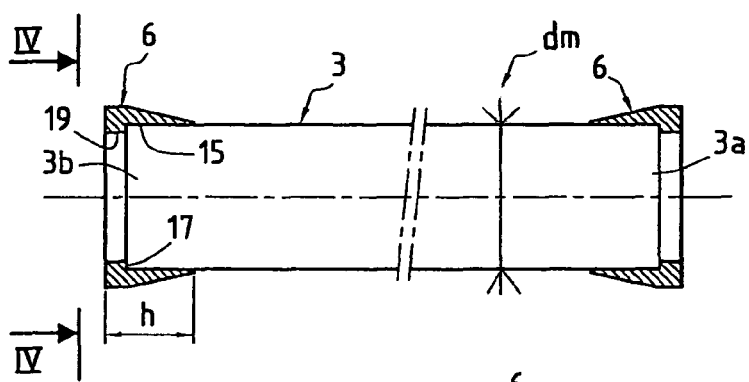
FIG. 3 shows a filter element fitted on each of its terminal portions with a sealing gasket of the invention.
Figure 4:
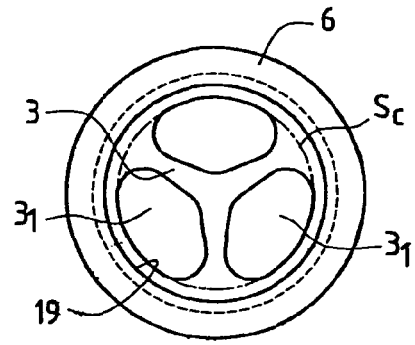
FIG. 4 is a transverse view on a larger scale seen looking substantially along liens IV-IV of FIG. 3 and showing a characteristic detail of the invention.
Figure 5:
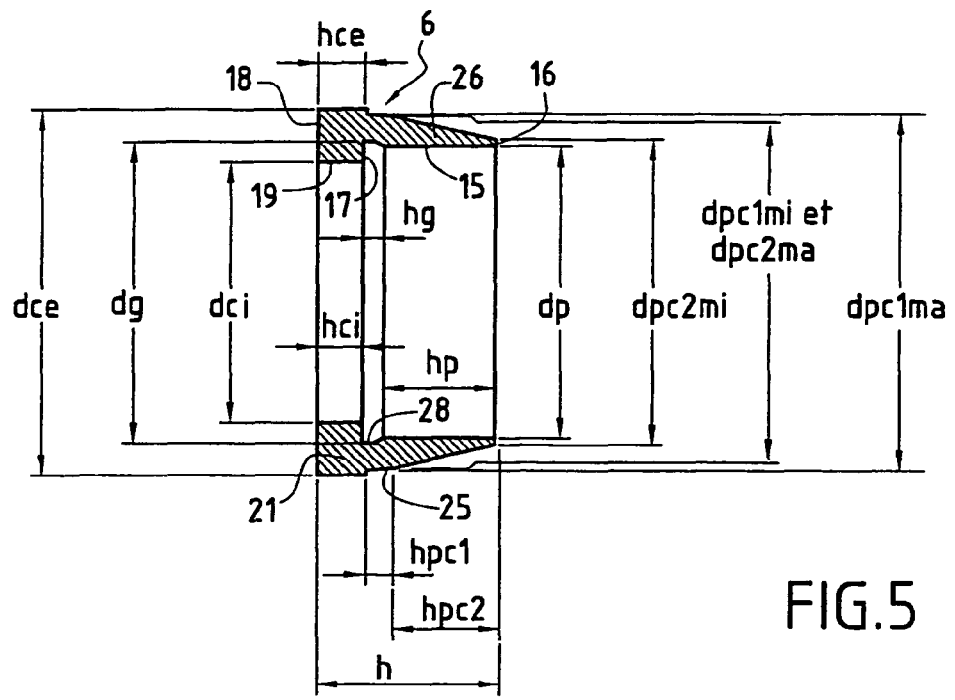
FIG. 5 is a view on a larger scale showing various characteristics of an embodiment of a sealing gasket of the invention.

As can be seen more precisely in FIGS. 3 to 5, each sealing gasket 6 is in the form of a sleeve of axial height h that is not less than the height hps of the support plate 4. Thus, the sealing gasket 6 is capable of covering the filter element 3 over a length that is not less than the height hps of the support plate 4. Under such conditions, the filter element 3 cannot come into contact with the support plate 4 so the filter element 3 is not subjected to friction or to erosion that might lead to breakage thereof.

According to another characteristic of the invention, the sealing gasket 6 has an overlap bore 15 for the filter element 3 which extends between one end 16 of the sleeve and a shoulder 17 which co-operates with the other end 18 of the sleeve to define a fluid-channeling bore 19. As can be seen more clearly in FIG. 3, the shoulder 17 serves as an abutment for the general portion of the filter element 3. This shoulder 17 presents a surface of dimensions that are adapted to extend outside the free flow section Sc for the fluid. As can be seen more precisely in FIG. 4, each filter element 3 comprises at least one, and in the example shown, three flow channels 31 lying within the free flow section Sc. In other words, this flow section Sc corresponds to the envelope containing all of the flow channels $3_1$, such that a peripheral surface exists around said section extending to the periphery of the filter element. Thus, the shoulder 17 presents dimensions that are adapted to extend outside the flow section Sc of the filter element so as to avoid impeding the flow of fluid flowing out from the channels $3_1$.

According to a characteristic of the invention, the overlap bore 15 possesses a determined height hp and a determined diameter dp. Considering that the diameter of the filter element 3 is equal to dm, the ratio of the diameter dp of the overlap bore over the diameter dm of the filter element lies in the range 0.6 to 1, and the ratio between the height hp of the overlap bore 15 and the diameter dm of the filter element 3 lies in the range 0.2 to 1.5.

According to another characteristic of the invention, the channel bore 19 has a determined inside diameter dci and a determined inside height hci. The inside height hci of the channel bore 19 lies between the inside diameter dci of the channel bore divided by 2 and the inside diameter dci of the channel bore divided by 24. Furthermore, the ratio of the inside diameter dci of the channel bore 19 divided by the diameter dm of the filter element 3 lies in the range 0.77 to 0.9.

According to a preferred embodiment characteristic, each sealing gasket 6 possesses a determined outside diameter dce starting from the end 18 into which the channel bore 19 opens out, this determined diameter dce extending over a determined height hce so as to form an outside collar 21. Over its entire height, this collar 21 thus presents a diameter that is constant. The ratio of the diameter dce of the collar 21 over the diameter dm of the filter element lies in the range 1.1 to 2.

According to a preferred embodiment characteristic, facing each passage 5, each backplate 11 has a countersink 23 formed in that one of the main faces of the backplate 11 that faces the adjacent support plate 4. Each countersink 23 is in communication with a through hole 24 formed in the backplate 11 and is adapted to receive a sealing gasket 6. More precisely, each countersink 23 is designed to receive the gasket 6 starting from its end 18 so as to receive at least part of the collar 21 of the sleeve. According to an embodiment characteristic, the height hce of the outer collar 21 is such that the ratio of said height hce over the height h1 of the countersink 23 lies in the range 1.5 to 10.

According to another characteristic of the invention, each sealing gasket 6 possesses on its outside, starting from the collar 21, a first portion 25 of tapering shape and a second portion 26 of tapering shape extending to the end 16 into which the overlap bore 15 opens out.

According to an embodiment characteristic, the first tapering portion 25 possesses a maximum outside diameter dpc1ma, a minimum outside diameter dpc1mi and an outside height hpc1. The outside height hpc1 of the first tapering portion 25 lies between the diameter dm of the filter element divided by 5 and the diameter dm of the filter element divided by 20.

According to another preferred embodiment characteristic, the ratio between the maximum outside diameter dpc1ma of the first tapering portion 25 over the diameter dce of the collar lies in the range 0.77 to 1. while the ratio of the minimum outside diameter dpc1mi of the first tapering portion 25 over the maximum outside diameter dpc1ma of the first tapering portion lies in the range 0.83 to 1.

According to another preferred embodiment characteristic, the second tapering portion 26 possesses a maximum outside diameter dpc2ma equal to the minimum outside diameter dpc1mi of the first tapering portion 25. This second tapering portion 26 also possesses a determined minimum outside diameter dpc2mi and a determined outside height hpc2. The ratio of the diameter dp of the overlap bore 15 over the minimum outside diameter dpc2mi of the second tapering portion 26 lies in the range 0.8 to 1, while the ratio of the diameter hpc2 of the second tapering portion 26 over the diameter dm of the filter element 3 lies in the range 0.2 to 1.5.

According to another characteristic of the invention, the overlap bore 15 has a groove 28 adjacent to the shoulder 17 in order to allow the constituent material of the sealing gasket 6 to creep. Thus, when the backplate 11 is clamped on the support plate 4, a portion of the gasket material can creep into the inside of the groove 28 while not obstructing the flow section Sc of the filter element.

According to a preferred embodiment characteristic, the groove 28 presents a determined diameter dg and a determined height hg such that the ratio of the groove diameter dg over the diameter dm of the filter element lies in the range 1 to 1.5, while the ratio of the groove height hg over the inside diameter hci of the channel bore 19 lies in the range 0.2 to 1.

Figure 6:
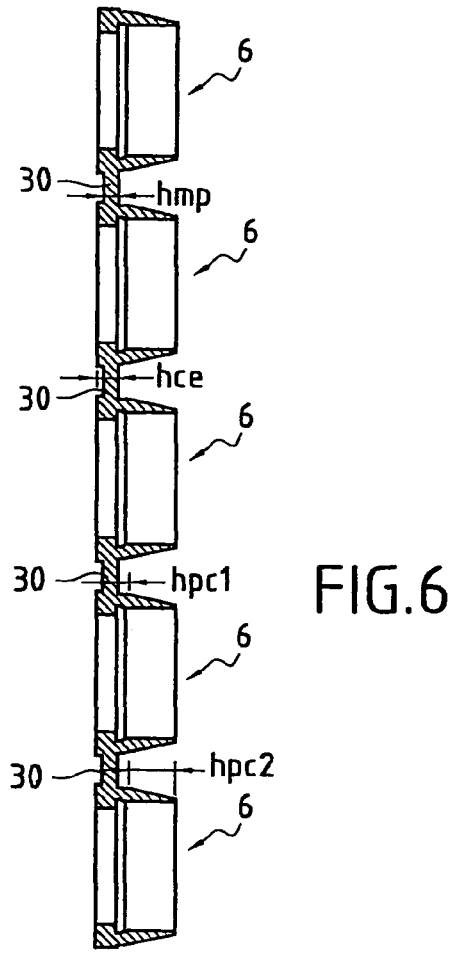
FIG. 6 shows a multiple sealing gasket in accordance with the invention.

In the above example, each support plate 4 has a series of distinct individual gaskets 6 each mounted in a respective passage 5. According to another embodiment characteristic shown more particularly in FIG. 6, a series of sealing gaskets 6 for mounting on a support plate 4 can be interconnected via connection zones 30 in such a manner as to constitute a single part. Each connection zone 30 possesses a determined height hmp such that the ratio hmp over the height hce of the collar 21 lies in the range 1 to 0.2.

The invention is not limited to the examples described and shown, since various modifications can be applied thereto without going beyond the ambit of the invention.

The invention claimed is:

1. A sealing gasket for mounting in a passage (5) of a support plate (4) to surround the end of a tubular-shaped filter element (3) provided with at least one fluid flow channel ($3_1$), the channel lying within a flow section Sc, the gasket being characterized in that it is made in the form of a sleeve:
possessing a height h not less than the height hps of the passage (5) in the support plate (4); and
presenting an overlap bore (15) for the filter element (3) defined between one end (16) of the sleeve and a shoulder (17) having a surface perpendicular to a surface of the overlap bore and which co-operates with the other end of the sleeve to define a channel bore (19) for the fluid, the shoulder (17) possessing a surface for acting as an abutment for the terminal portion of the filter element and presenting dimensions that are adapted to extend outside the flow section Sc so as to avoid impeding fluid circulation, the overlap bore (15) being provided with a groove (28) adjacent to the shoulder (17) in order to allow the gasket to creep, wherein the groove (28) presents a diameter dg and a height hg such that the ratio dg/dm lies in the range 1 to 1.5 and the ratio hg/hci lies in the range 0.2 to 1, with dm being the diameter of the filter element (3), and with hci being the height of the channel bore (19).

2. A sealing gasket according to claim 1, characterized in that the overlap bore (15) possesses a height hp and a diameter dp such that the ratio dp/dm lies in the range 0.6 to 1, and the ratio hp/dm lies in the range 0.2 to 1.5, where dm is the diameter of the filter element (3).

3. A sealing gasket according to claim 1, characterized in that the channel bore (19) possesses an inside diameter dci and an inside height hci lying in the range dci/2 to dci/24 and such that the ratio dci/dm lies in the range 0.77 to 0.9.

4. A sealing gasket according claim 1, characterized in that the sleeve possesses on the outside, starting from the end (18) into which the channel bore (19) opens out, a diameter dci extending over a height hce, so as to form an outside collar (21), the ratio dce/dm lying in the range 1.1 to 2 and the ratio hce/hl lying in the range 1.5 to 10, where hl is the height of a gasket-receiving countersink (23) formed in the backplate (11) for fixing on the support plate (4).

5. A sealing gasket according to claim 4, characterized in that the outside of the sleeve, starting from the collar (21), possesses a first tapering portion (25) and a second tapering portion (26) extending to its end (16) into which the overlap bore (15) opens out.

6. A sealing gasket according to claim 5, characterized in that:
the first tapering portion (25) possesses a maximum outside diameter dpc1ma, a minimum outside diameter dpc1mi and an outside height hpc1 lying in the range dm/5 to dm/20, and such that the ratio dpc1ma/dce lies in the range 0.77 to 1, and the ratio dpc1mi/dpc1ma lies in the range 0.83 to 1; and
the second tapering portion (26) possesses a maximum outside diameter dpc2ma equal to the minimum outside diameter dpc1mi of the first tapering portion (25) and a minimum outside diameter dpc2mi and an outside height hpc2 such that the ratio dp/dpc2mi lies in the range 0.8 to 1, and the ratio hpc2/dm lies in the range 0.2 to 1.5.

7. A multiple sealing gasket characterized in that it comprises a series of gaskets (6) in accordance with claim 1 interconnected by connection zones (30).

8. A multiple sealing gasket according to claim 7, characterized in that the connection zones (30) are of a height hmp such that the ratio hmp/hce lies in the range 1 to 0.2.

9. A filter module of the type comprising at least one filter element (3) supported at each of its terminal portions by a support plate (4) provided with a passage (5) and having a backplate (11) fixed thereon, which backplate is provided with a countersink (23) for each filter element (3),
the module being characterized in that for each passage (5) of the support plates (4), it includes a gasket (6) in accordance with claim 1.

10. A filter module of the type comprising at least one filter element (3) supported at each of its terminal portions by a support plate (4) provided with a passage (5) and having a backplate (11) fixed thereon, which backplate is provided with a countersink (23) for each filter element (3),
the module being characterized in that it includes a gasket (6) in accordance with claim 1 fitted to each support plate (4).

11. A filter module of the type comprising at least one filter element (3) supported at each of its terminal portions by a support plate (4) provided with a passage (5) and having a backplate (11) fixed thereon, which backplate is provided with a countersink (23) for each filter element (3),
the module being characterized in that it includes a multiple gasket in accordance with claim 7 fitted to each support plate (4).

12. The filter module of claim 1, wherein the overlap bore has a constant height.

* * * * *